United States Patent
Dwarakesh et al.

(10) Patent No.: US 12,432,160 B2
(45) Date of Patent: Sep. 30, 2025

(54) MANAGING CUSTOM RESOURCES BETWEEN A CONTROLLER AND WORKER NODES IN A CONTAINER ORCHESTRATION SYSTEM

(71) Applicant: VMWARE, INC., Palo Alto, CA (US)

(72) Inventors: Palla Golla Dwarakesh, Bangalore (IN); Anand Pritam, Bangalore (IN); Venu Gopala Rao Kotha, Bangalore (IN)

(73) Assignee: VMware LLC, Palo Alto, CA (US)

( * ) Notice: Subject to any disclaimer, the term of this patent is extended or adjusted under 35 U.S.C. 154(b) by 60 days.

(21) Appl. No.: 18/376,848

(22) Filed: Oct. 5, 2023

(65) Prior Publication Data
US 2025/0007859 A1 Jan. 2, 2025

(30) Foreign Application Priority Data
Jun. 30, 2023 (IN) .............................. 202341043950

(51) Int. Cl.
G06F 15/173 (2006.01)
H04L 47/78 (2022.01)
H04L 47/80 (2022.01)

(52) U.S. Cl.
CPC .......... H04L 47/781 (2013.01); H04L 47/803 (2013.01)

(58) Field of Classification Search
CPC ............................ H04L 47/781; H04L 47/803
See application file for complete search history.

(56) References Cited

U.S. PATENT DOCUMENTS

| | | | |
|---|---|---|---|
| 12,212,680 B2 * | 1/2025 | Madisetti ............ | H04L 41/5058 |
| 2012/0304195 A1 * | 11/2012 | Periorellis ................ | G06F 9/52 718/106 |
| 2023/0259392 A1 * | 8/2023 | Bai ....................... | G06F 9/5005 718/102 |

* cited by examiner

*Primary Examiner* — Joseph R Maniwang
(74) *Attorney, Agent, or Firm* — Kim & Stewart LLP

(57) ABSTRACT

An example method of managing a custom resource in a container orchestration (CO) system, the CO system including a plurality of hosts executing a controller and a set of workers, is described. The method includes generating, at the controller in response to a specification of the custom resource by a user, a flow plan, the flow plan including a sequence of flows for execution by a worker in the set of workers; providing, by the controller, the flow plan to the worker; executing, by a flow executor on the worker, the sequence of flows in the flow plan to deploy the custom resource; generating, by the flow executor on the worker, at least one event during execution of the flow plan; and notifying, by the worker, the controller of the at least one event.

20 Claims, 6 Drawing Sheets

MANAGING CUSTOM RESOURCES BETWEEN A CONTROLLER AND WORKER NODES IN A CONTAINER ORCHESTRATION SYSTEM

RELATED APPLICATIONS

Benefit is claimed under 35 U.S.C. 119 (a)-(d) to Foreign application No. 202341043950 filed in India entitled "MANAGING CUSTOM RESOURCES BETWEEN A CONTROLLER AND WORKER NODES IN A CONTAINER ORCHESTRATION SYSTEM", on Jun. 30, 2023, by VMware, Inc., which is herein incorporated in its entirety by reference for all purposes.

BACKGROUND

Applications today are deployed onto a combination of virtual machines (VMs), containers, application services, and more. For deploying such applications, a container orchestrator (CO) known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into logical unit called "pod" that execute on nodes in a cluster. Containers in the same pod share the same resources and network and maintain a degree of isolation from containers in other pods. The pods are distributed across nodes of the cluster. In a typical deployment, a node includes an operating system (OS), such as Linux®, and a container engine executing on top of the OS that supports the containers of the pod. A node can be a physical server or a VM.

In a radio access network (RAN) deployment, such as a 5G RAN deployment, cell site network functions can be realized as Kubernetes pods. Each cell site can be deployed with one or more servers. Containerized network functions (CNFs) execute in the servers of the cell sites. Kubernetes clusters and CNFs can be deployed to cell sites using custom resources (CRs). A CR is a mechanism for extending the Kubernetes application programming interface (API) by defining a new resource type. CRs allow an operator to define custom resources that can be managed the same way as built-in resources, such as deployments, pods, services, and the like. A managed Kubernetes environment, such as a RAN deployment, can include a controller and several worker nodes. The controller provides a unified interface that can be used to deploy CRs on the worker nodes.

The controller needs to be aware of the state of the CRs across all worker nodes. The controller needs to instruct the worker nodes about the CRs that need to be deployed. The controller needs to be made aware of any errors that arise as part of CR deployment. There is a need for management of CRs between controller and worker nodes in a container orchestration system, such as Kubernetes, in deployments such as a RAN deployment.

SUMMARY

In an embodiment, a method of managing a custom resource in a container orchestration (CO) system, the CO system comprising a plurality of hosts executing a controller and a set of workers, is described. The method includes generating, at the controller in response to a specification of the custom resource by a user, a flow plan. The flow plan comprises a sequence of flows for execution by a worker in the set of workers. The method includes providing, by the controller, the flow plan to the worker. The method includes executing, by a flow executor on the worker, the sequence of flows in the flow plan to deploy the custom resource. The method includes generating, by the flow executor on the worker, at least one event during execution of the flow plan. The method includes notifying, by the worker, the controller of the at least one event.

Further embodiments include a non-transitory computer-readable storage medium comprising instructions that cause a computer system to carry out the above method, as well as a computer system configured to carry out the above method.

DETAILED DESCRIPTION

Figure 1:
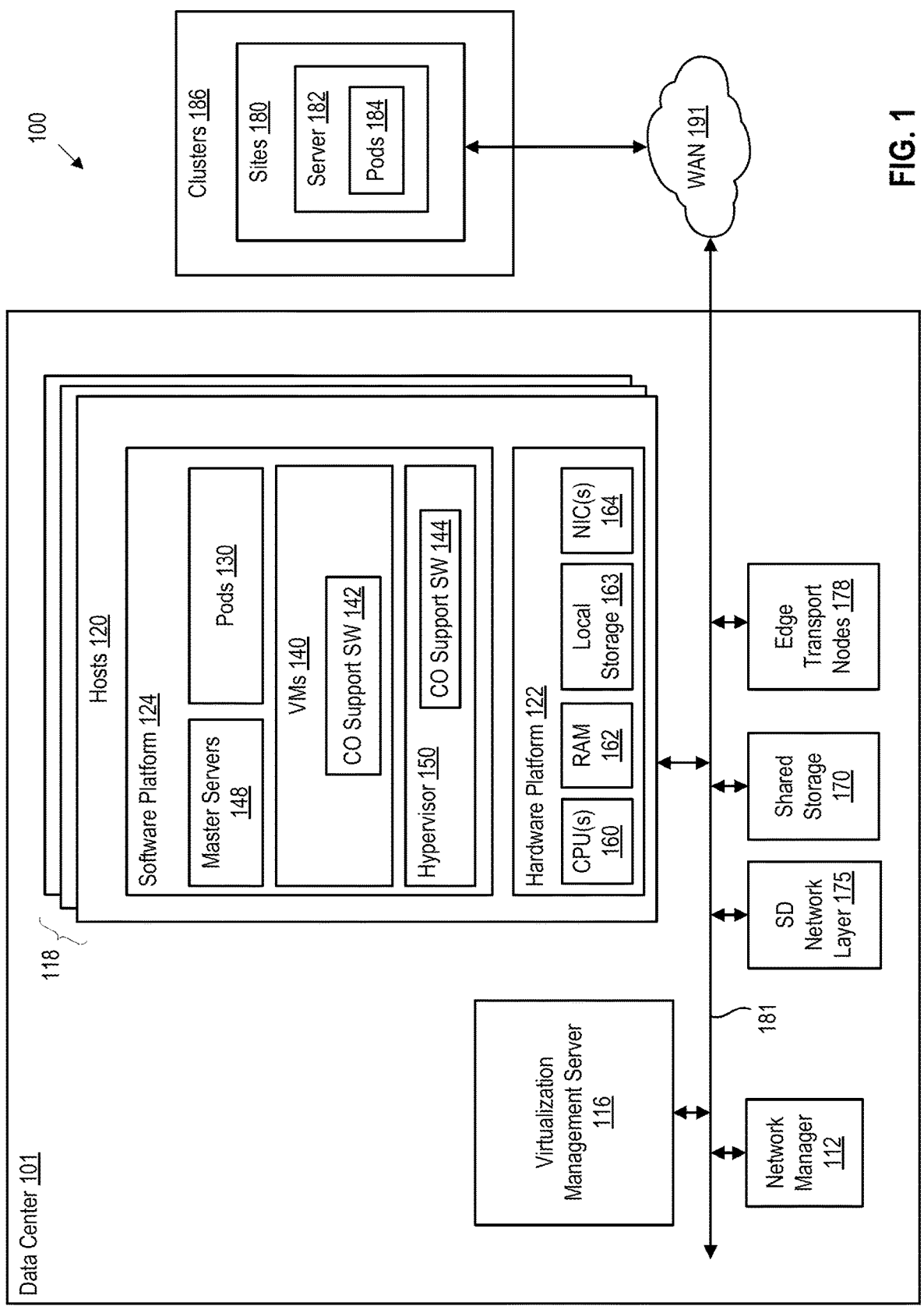
FIG. 1 is a block diagram of a virtualized computing system in which embodiments described herein may be implemented.

FIG. 1 is a block diagram of a virtualized computing system 100 in which embodiments described herein may be implemented. Virtualized computing system includes a data center 101 in communication with a plurality of sites 180 through a wide area network (WAN) 191 (e.g., the public Internet). Sites 180 can be geographical dispersed with respect to each other and with respect to data center 101. For example, sites 180 can be part of a radio access network (RAN) dispersed across a geographic region and serving different portions of such geographic region. Sites 180 can be organized into clusters 186, where each cluster 186 comprises a plurality of sites 180. In embodiments, data center 101 comprises a software-defined data center (SDDC) deployed in a cloud, such as a public cloud, private cloud, or multi-cloud system (e.g., a hybrid cloud system). In other embodiments, data center 101 can be deployed by itself outside of any cloud environment.

Data center 101 includes hosts 120. Hosts 120 may be constructed on hardware platforms such as an x86 architecture platforms. One or more groups of hosts 120 can be managed as clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 181. Physical network 181 enables communication between hosts 120 and between other components and hosts 120 (other components discussed further herein).

In the embodiment illustrated in FIG. 1, hosts 120 access shared storage 170 by using NICs 164 to connect to network 181. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA.

Virtualized computing system 100 is configured with a software-defined (SD) network layer 175. SD network layer 175 includes logical network services executing on virtualized infrastructure of hosts 120. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to WAN 191. Edge transport nodes 178 can include a gateway (e.g., implemented by a router) between the internal logical networking of host cluster 118 and the external network. Edge transport nodes 178 can be physical servers or VMs. Virtualized computing system 100 also includes physical network devices (e.g., physical routers/switches) as part of physical network 181, which are not explicitly shown.

Virtualization management server 116 is a physical or virtual server that manages hosts 120 and the hypervisors therein. Virtualization management server 116 installs agent(s) in hypervisor 150 to add a host 120 as a managed entity. Virtualization management server 116 can logically group hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118. While only one virtualization management server 116 is shown, virtualized computing system 100 can include multiple virtualization management servers each managing one or more host clusters.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents in hypervisor 150 to add a host 120 as a managed entity, referred to as a transport node. One example of an SD networking platform that can be configured and used in embodiments described herein as network manager 112 and SD network layer 175 is a VMware NSX® platform made commercially available by VMware, Inc. of Palo Alto, CA. In other embodiments. SD network layer 175 is orchestrated and managed by virtualization management server 116 without the presence of network manager 112.

In embodiments, sites 180 perform software functions using containers. For example, in a RAN, sites 180 can include container network functions (CNFs) deployed as pods 184 by a container orchestrator (CO), such as Kubernetes. The CO control plane includes a master server 148 executing in host(s) 120. A master server 148 can execute in VM(s) 140 and includes various components, such as an application programming interface (API), database, controllers, and the like. A master server 148 is configured to deploy and manage pods 184 executing in sites 180. In some embodiments, a master server 148 can also deploy pods 130 on hosts 120 (e.g., in VMs 140). At least a portion of hosts 120 comprise a management cluster having master servers 148 and pods 130.

In embodiments. VMs 140 include CO support software 142 to support execution of pods 130. CO support software 142 can include, for example, a container runtime, a CO agent (e.g., kubelet), and the like. In some embodiments, hypervisor 150 can include CO support software 144. In embodiments, hypervisor 150 is integrated with a container orchestration control plane, such as a Kubernetes control plane. This integration provides a "supervisor cluster" (i.e., management cluster) that uses VMs to implement both control plane nodes and compute objects managed by the Kubernetes control plane. For example, Kubernetes pods are implemented as "pod VMs," each of which includes a kernel and container engine that supports execution of containers. The Kubernetes control plane of the supervisor cluster is extended to support VM objects in addition to pods, where the VM objects are implemented using native VMs (as opposed to pod VMs). In such case, CO support software 144 can include a CO agent that cooperates with a master server 148 to deploy pods 130 in pod VMs of VMs 140.

Figure 2:
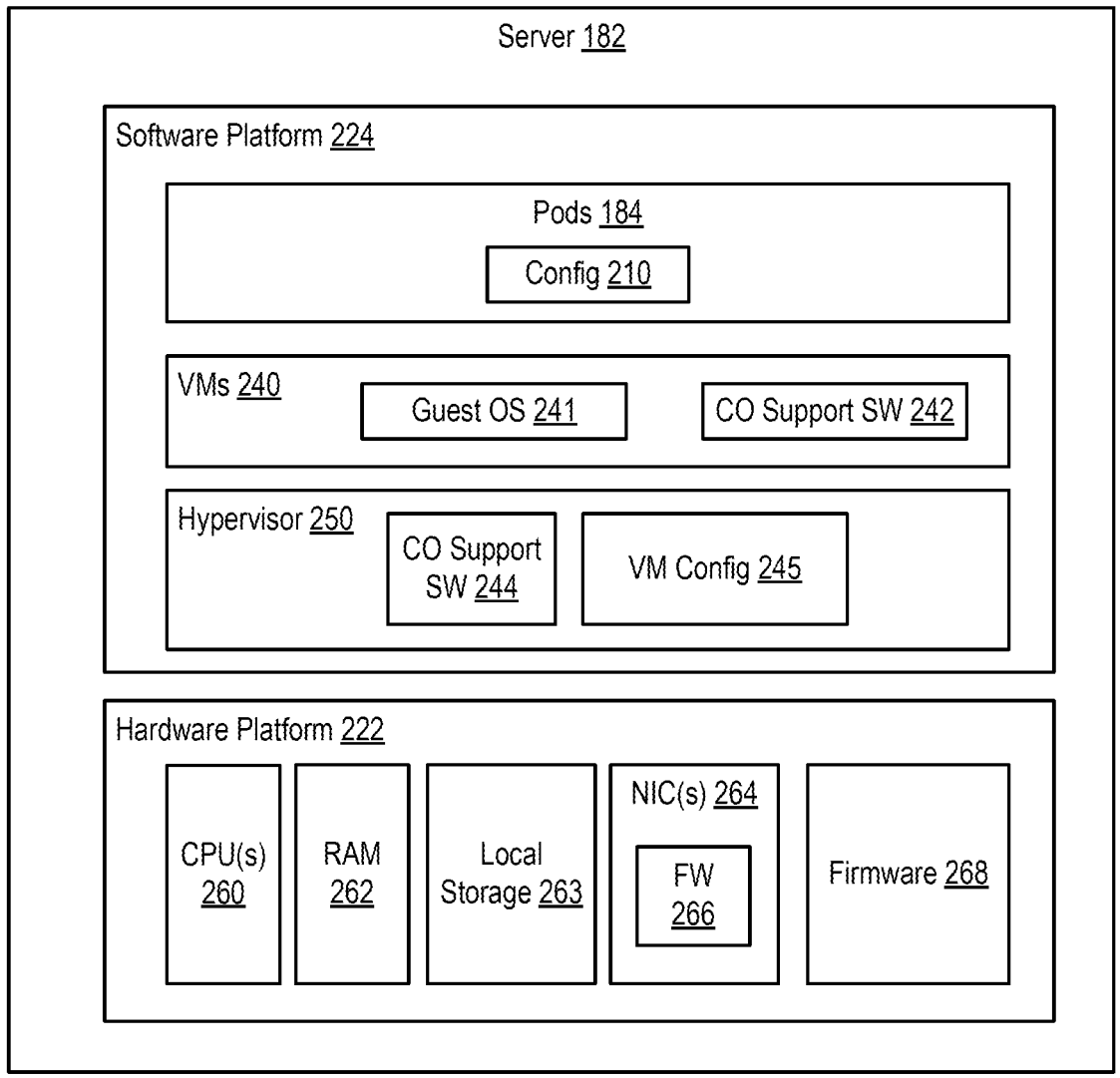
FIG. 2 is a block diagram depicting a server of a site according to embodiments.

FIG. 2 is a block diagram depicting a server 182 of a site 180 according to embodiments. Server 182 may be constructed on a hardware platform such as an x86 architecture platform. As shown, a hardware platform 222 of server 182 includes conventional components of a computing device, such as one or more CPUs 260, system memory (e.g., RAM 262), one or more NICs 264, firmware 268 (e.g., BIOS or the like), and local storage 263. CPUs 260 are configured to execute instructions, for example, executable instructions that perform one or more operations described herein, which may be stored in RAM 262. NICs 264 enable server 182 to communicate with other devices (i.e., data center 101). In the example, NICs 264 have firmware 266.

A software platform 224 of server 182 includes a hypervisor 250, which directly executes on hardware platform 222. In an embodiment, there is no intervening software, such as a host OS, between hypervisor 250 and hardware platform 222. Thus, hypervisor 250 is a Type-1 hypervisor (also known as a "bare-metal" hypervisor). Hypervisor 150 supports multiple VMs 240, which may be concurrently instantiated and executed. Pods 184 execute in VMs 240 and have a configuration 210. For example, pods 184 can execute network functions (e.g., containerized network functions (CNFs)). In embodiments, VMs 240 include CO support software 242 and a guest operating system (OS) 241 to support execution of pods 184. CO support software 242 can include, for example, a container runtime, a CO agent (e.g., kubelet), and the like. Guest OS 241 can be any commercial operating system (e.g., Linux®). In some embodiments, hypervisor 250 can include CO support software 244 that functions as described above with hypervisor 150. Hypervisor 250 can maintain VM config data 245 for VMs 240.

Figure 3:
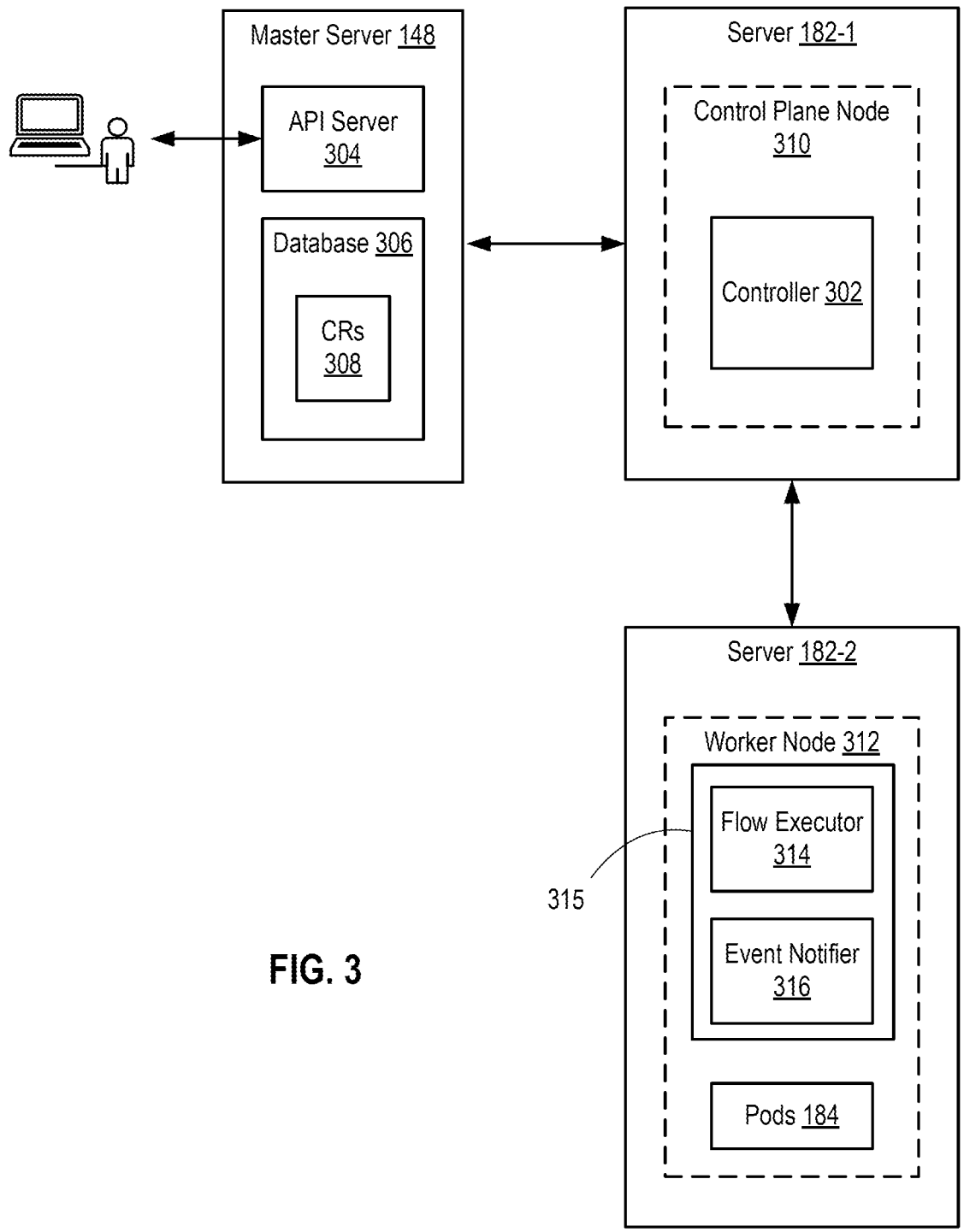
FIG. 3 is a block diagram depicting a container orchestration (CO) system according to embodiments.

FIG. 3 is a block diagram depicting a container orchestration (CO) system according to embodiments. The CO system includes master server 148 and servers 182-1 and 182-2. In embodiments, master server 148 executes in data center 101 and servers 182-1 and 182-2 execute in sites 180. Master server 148 includes an application programming interface (API) server 304 and a database 306. A user interacts with API server 304 to define resources for the CO system, such as pods, deployments, services, and the like. The users specifies, through API server 304, states of the resources and the master server 148 executes workflows to apply and maintain the states. In embodiments, the user interacts with API server 304 to define custom resources (CRs) 308. CRs 308 are extensions of the resources supported by master server 148. Master server 148 delegates management of CRs 308 to a controller 302.

In embodiments, controller 302 executes in a server 182-1. Server 182-1 can implement a control plane node 310 of the CO system. In embodiments, controller 302 monitors database 306 for CRs 308. In other embodiments, API server 304 notifies controller 302 of CRs 308. In the example, controller 302 is described as executing in a server 182-1 at a site 180. In other embodiments, controller 302 can execute in a host 120 of data center 101. In still other embodiments, controller 302 can execute in master server 148.

Controller 302 detects CRs 308. For each CR 308, controller 302 is configured to generate a flow plan from the CR 308. In embodiments, CR 308 includes a definition for the flow plan. For example, the flow plan can be specified using Javascript Object Notation (JSON) or the like. Controller 302 parses CR 308, detects the specification of the flow plan, and assembles the flow plan. A flow plan comprises a sequence of flows (e.g., a plurality of flows to be executed in a specific order). Each flow comprises a sequence of instructions to be performed by a worker node. For example, the sequence of instructions of a flow can deploy one or more pods 184 to implement custom network functions. A flow further includes a set of execute conditions. The execute conditions can be combined with logical operators (e.g., AND, OR, etc.). The execute conditions are used to evaluate if a flow has been executed and the state of the flow's execution (e.g., pending, success, failure, etc.). A flow plan can further include one or more flow conditions. A flow condition can be used to control execution of flows in the sequence. For example, once a first flow has been executed, the worker can wait for certain actions to be completed before executing a second flow. A flow condition includes what needs to be evaluated and what actions need to be taken based on the evaluation result.

Controller 302 generates the flow plan and sends the flow plan to worker node 312 executing in server 182-2. In the example, controller 302 sends the flow plan to a single worker node 312. In other embodiments, controller 302 can send flow plan to multiple worker nodes 312. Worker node 312 (also referred to as worker) includes a flow executor 314 and an event notifier 316. Flow executor 314 and event notifier 316 can execute in one or more pods 315. Flow executor 314 receives the flow plan and executes each flow in the flow plan in a serial fashion based on the defined sequence. Flow executor 314 also evaluates any flow conditions defined in the flow plan when transitioning from one flow to the next flow. For each flow, flow executor 314 performs the defined sequence of instructions. For each flow, flow executor 314 maintains an execution context that tracks the state of the flow. Flow executor 314 evaluates any defined execute conditions during and after execution of the flow. Flow executor 314 generates event(s) in response to evaluation of the execute conditions. For example, an execute condition to determines if a flow is pending or complete can generate an event of pending or complete. An execute condition that determines the status of a completed flow can generate an event of success or failure. In embodiments, events are defined in the flow plan. The user can define the events in CR 308, which are implemented into the flow plan by controller 302.

In this manner, worker node 312 can execute a flow plan to deploy pods 184 and report events back to controller 302. Controller 302 can in turn post events to master server 148. A user can interact with master server 148 to monitor the events and track the progress of flow plans dictated by CRs 308.

Figure 4:
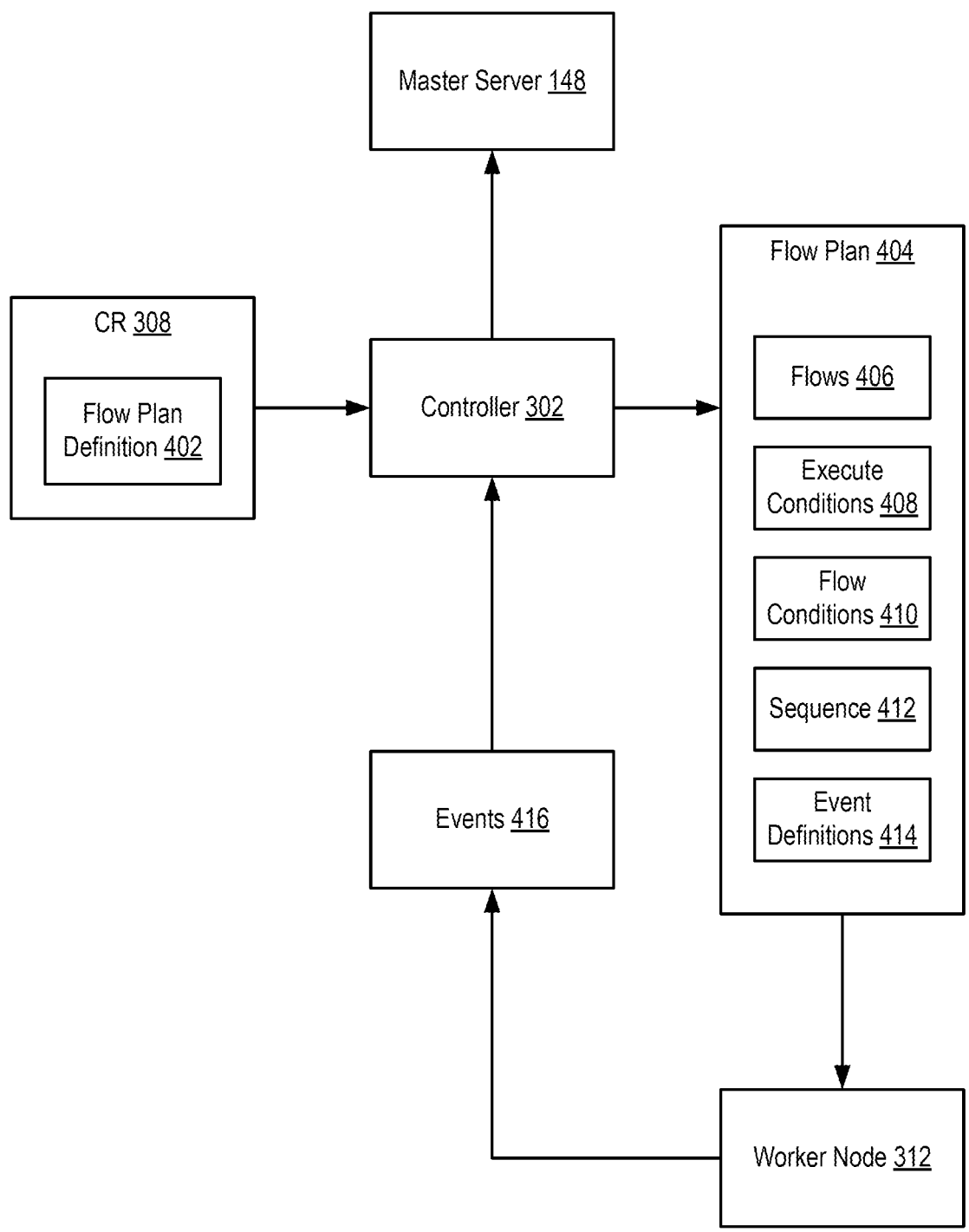
FIG. 4 is a block diagram depicting data flow in the CO system according to embodiments.

FIG. 4 is a block diagram depicting data flow in the CO system according to embodiments. A user specifies a CR 308, which includes a flow plan definition 402. Controller 302 detects CR 308 and parses flow plan definition 402 to generate flow plan 404. Flow plan 404 includes a plurality of flows 406. A flow 406 can include execute conditions 408. Flows 406 can include a sequence 412 (e.g., an order of execution) and can also include flow conditions 410. Flow plan 404 can include event definitions 414 that define events generated by execution of flow plan 404. Controller 302 provides flow plan 404 to worker node 312 (or multiple worker nodes 312). Worker node 312 executes flow plan 404 as described above and generates events 416. Worker node 312 provides events 416 to controller 302. Controller 302 notifies master server 148 of events 416. A user can interact with master server 148 to monitor and track flow plans based on events 416 reported by controller 302.

Figure 5:
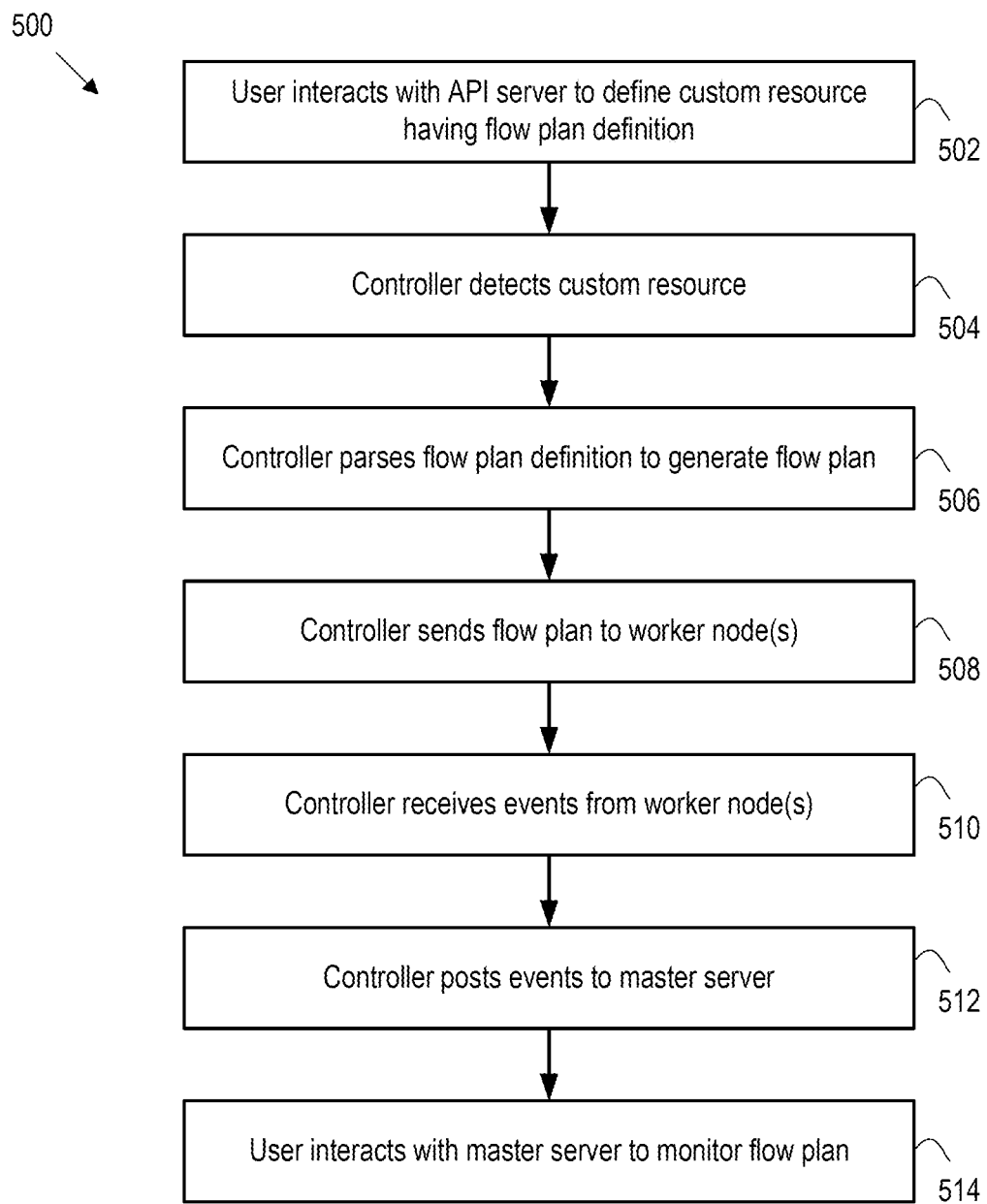
FIG. 5 is a flow diagram depicting a method of generating a flow plan for a custom resource in a CO system according to embodiments.

FIG. 5 is a flow diagram depicting a method 500 of generating a flow plan for a custom resource in a CO system according to embodiments. Method 500 begins at step 502, where a user interacts with API server 304 to define a custom resource having a flow plan definition. At step 504, controller 302 detects the custom resource. At step 506, controller 302 parses the flow plan definition to generate a flow plan. At step 508, controller 302 sends the flow plan to one or more worker nodes 312. At step 510, controller 302 receives events from worker node(s) 312 generated during execution of the flow plan. At step 512, controller 302 posts the events to master server 148. At step 514, the user interacts with master server 148 to monitor the flow plan based on the events.

Figure 6:
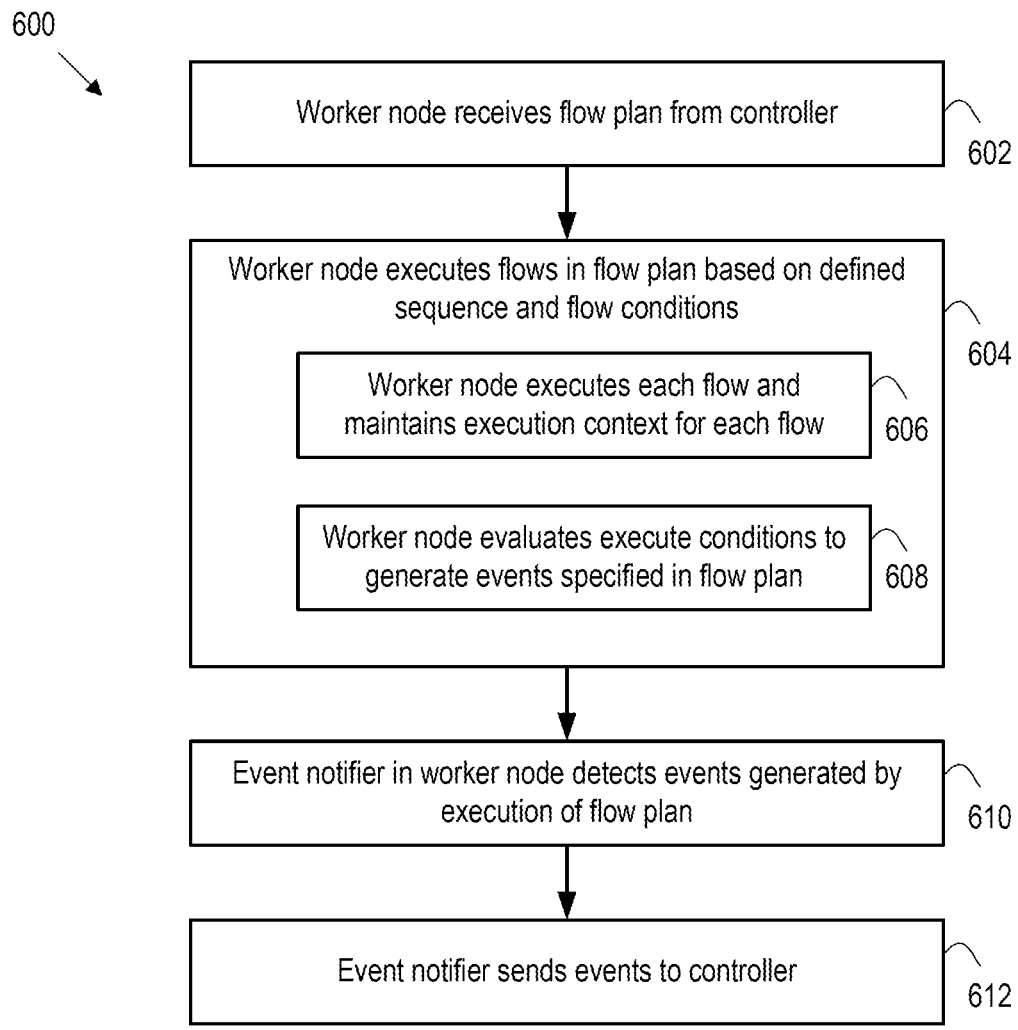
FIG. 6 is a flow diagram depicting a method of executing a flow plan at a worker node in CO system according to embodiments.

FIG. 6 is a flow diagram depicting a method 600 of executing a flow plan at a worker node in CO system according to embodiments. Method 600 begins at step 602, where worker node 312 receives the flow plan from controller 302. At step 604, worker node 312 executes the flows in the flow plan based on the defined sequence and flow conditions. At step 606, worker node 312 executes each flow and maintains an execution context for each flow. At step 608, worker node 312 evaluates execute conditions for each flow to generate events specified in the flow plan. At step 610, event notifier 316 in worker node 312 detects events generated by execution of the flow plan. At step 612, event notifier sends the events to controller 302.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

One or more embodiments of the present invention may be implemented as one or more computer programs or as one or more computer program modules embodied in computer readable media. The terms computer readable medium or non-transitory computer readable medium refer to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Certain embodiments as described above involve a hardware abstraction layer on top of a host computer. The hardware abstraction layer allows multiple contexts to share the hardware resource. These contexts can be isolated from each other, each having at least a user application running therein. The hardware abstraction layer thus provides benefits of resource isolation and allocation among the contexts. Virtual machines may be used as an example for the contexts and hypervisors may be used as an example for the hardware abstraction layer. In general, each virtual machine includes a guest operating system in which at least one application runs. It should be noted that, unless otherwise stated, one or more of these embodiments may also apply to other examples of contexts, such as containers. Containers implement operating system-level virtualization, wherein an abstraction layer is provided on top of a kernel of an operating system on a host computer or a kernel of a guest operating system of a VM. The abstraction layer supports multiple containers each including an application and its dependencies. Each container runs as an isolated process in user-space on the underlying operating system and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific configurations. Other allocations of functionality are envisioned and may fall within the scope of the appended claims. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of managing a custom resource in a container orchestration (CO) system, the CO system comprising a plurality of hosts executing a controller and a set of workers, the method comprising:
   generating, at the controller in response to a specification of the custom resource, a flow plan, the flow plan comprising a sequence of flows for execution by a worker in the set of workers, the controller and the workers executing in servers at sites of a radio access network (RAN), the controller receiving the specification of the custom resource from a data center in communication with the RAN;
   providing, by the controller, the flow plan to the worker;
   executing, by a flow executor on the worker, the sequence of flows in the flow plan to deploy the custom resource as a containerized network function (CNF);
   generating, by the flow executor on the worker, at least one event during execution of the flow plan; and
   notifying, by the worker, the controller of the at least one event.

2. The method of claim 1, wherein a flow in the sequence of flows includes a set of conditions that determine state of the flow in response to its execution, and wherein the flow executor evaluates the set of conditions to generate the at least one event.

3. The method of claim 2, wherein the set of conditions are combined with at least one logical operator.

4. The method of claim 2, wherein the flow in the sequence of flows includes an event definition that specifies an event associated with a specific state of the flow, and wherein an event notifier of the worker sends the event to the controller in response to the state of the flow, as determined by the set of conditions, matches the specific state.

5. The method of claim 1, wherein each flow in the sequence of flows includes a set of instructions, and wherein the flow executor on the worker executes the set of instructions for each flow in the sequence of flows.

6. The method of claim 1, further comprising:
providing, by the controller, state of the flow plan to the user in response to a request by the user, the controller generating the state of the flow plan based on the at least one event.

7. The method of claim 1, wherein the custom resource is specified through an application programming interface (API) server executing in the data center.

8. A non-transitory computer readable medium comprising instructions to be executed in a computing device to cause the computing device to carry out a method of managing a custom resource in a container orchestration (CO) system, the CO system comprising a plurality of hosts executing a controller and a set of workers, the method comprising:
generating, at the controller in response to a specification of the custom resource, a flow plan, the flow plan comprising a sequence of flows for execution by a worker in the set of workers, the controller and the workers executing in servers at sites of a radio access network (RAN), the controller receiving the specification of the custom resource from a data center in communication with the RAN;
providing, by the controller, the flow plan to the worker;
executing, by a flow executor on the worker, the sequence of flows in the flow plan to deploy the custom resource as a containerized network function (CNF);
generating, by the flow executor on the worker, at least one event during execution of the flow plan; and
notifying, by the worker, the controller of the at least one event.

9. The non-transitory computer readable medium of claim 8, wherein a flow in the sequence of flows includes a set of conditions that determine state of the flow in response to its execution, and wherein the flow executor evaluates the set of conditions to generate the at least one event.

10. The non-transitory computer readable medium of claim 9, wherein the set of conditions are combined with at least one logical operator.

11. The non-transitory computer readable medium of claim 9, wherein the flow in the sequence of flows includes an event definition that specifies an event associated with a specific state of the flow, and wherein an event notifier of the worker sends the event to the controller in response to the state of the flow, as determined by the set of conditions, matches the specific state.

12. The non-transitory computer readable medium of claim 8, wherein each flow in the sequence of flows includes a set of instructions, and wherein the flow executor on the worker executes the set of instructions for each flow in the sequence of flows.

13. The non-transitory computer readable medium of claim 8, further comprising:
providing, by the controller, state of the flow plan to the user in response to a request by the user, the controller generating the state of the flow plan based on the at least one event.

14. The non-transitory computer readable medium of claim 8, wherein the custom resource is specified through an application programming interface (API) server executing in the data center.

15. A computer system, comprising:
a hardware platform;
software, executing on the hardware platform, configured to:
receive a flow plan from a controller in a container orchestration (CO) system, the flow plan generated by the controller in response to specification of a custom resource, the flow plan comprising a sequence of flows, the controller and the hardware platform located at sites of a radio access network (RAN), the controller receiving the specification of the custom resource from a data center in communication with the RAN;
execute, by a flow executor, the sequence of flows in the flow plan to deploy the custom resource as a containerized network function (CNF);
generate, by the flow executor, at least one event during execution of the flow plan; and
notify the controller of the at least one event.

16. The computer system of claim 15, wherein a flow in the sequence of flows includes a set of conditions that determine state of the flow in response to its execution, and wherein the flow executor evaluates the set of conditions to generate the at least one event.

17. The computer system of claim 16, wherein the set of conditions are combined with at least one logical operator.

18. The computer system of claim 16, wherein the flow in the sequence of flows includes an event definition that specifies an event associated with a specific state of the flow, and wherein an event notifier of the worker sends the event to the controller in response to the state of the flow, as determined by the set of conditions, matches the specific state.

19. The computer system of claim 15, wherein each flow in the sequence of flows includes a set of instructions, and wherein the flow executor on the worker executes the set of instructions for each flow in the sequence of flows.

20. The computer system of claim 15, wherein the custom resource is specified through an application programming interface (API) server executing in the data center.

* * * * *